(12) United States Patent
Sundaresan et al.

(10) Patent No.: US 7,966,405 B2
(45) Date of Patent: Jun. 21, 2011

(54) SESSION MULTIPLEX PROTOCOL

(75) Inventors: Sharad Sundaresan, Sammamish, WA (US); Tahsin Erdogan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1542 days.

(21) Appl. No.: 10/879,428

(22) Filed: Jun. 29, 2004

(65) Prior Publication Data

US 2005/0286516 A1 Dec. 29, 2005

(51) Int. Cl.
*G06F 15/16* (2006.01)
(52) U.S. Cl. .................. 709/227; 709/228; 709/229
(58) Field of Classification Search .................. 709/227
See application file for complete search history.

(56) References Cited

U.S. PATENT DOCUMENTS

| | | | | |
|---|---|---|---|---|
| 6,456,603 | B1 * | 9/2002 | Ismailov et al. | 370/310 |
| 2002/0141365 | A1 * | 10/2002 | Leung | 370/335 |
| 2002/0174233 | A1 * | 11/2002 | Murakami | 709/227 |
| 2005/0131966 | A1 * | 6/2005 | Lou | 707/204 |
| 2005/0182800 | A1 * | 8/2005 | Ashwin et al. | 707/203 |

OTHER PUBLICATIONS

Agrawal, R. et al., "Performance Bounds for Flow Control Protocols", *IEEE/ACM Transactions on Networking*, Jun. 1999, 7(3), 310-323.
Fong-Su, C. et al, "Explicit Rate Flow Control for ABR Services in ATM Networks", *IEEE/ACM Transactions on Networking*, Jun. 2000, 8(3), 350-361.
Hoymany, F. "ATM Adaptation Layer Choice for IP/ATM Integration", *International Journal of Network Management*, 1999, 9, 379-386.
Jing, J. et al., "Client-Server Computing in Mobile Environments", *ACM Computing Surveys*, Jun. 1999, 31(2), 117-157.
Kalampoukas, L. et al., "Explicit Window Adaptation: A Method to Enhance TCP Performance", *IEEE/ACM Transactions on Networking*, Jun. 2002, 10(3), 338-350.
Levy, E. et al., "Distributed File Systems: Concepts and Examples", *ACM Computing Surveys*, Dec. 1990, 22(4), 321-374.
Mostafa, W. et al., "A Reliable Multicast Session Protocol for Collaborative Continuous-Feed Applications", *Proceedings of the 1997 ACM Symposium on Applied Computing*, 1997, 35-39.
Stiliadis, D. et al., "Design and Analysis of Frame-based Fair Queuing: A New Traffic Scheduling Algorithm for Packet-Switched Networks", *Sigmetrics*, 1996, 104-115.
Veres, A. et al., "On the Propagation of Long-Range Dependence in the Internet", *SIGCOMM*, 2000, 243-254.

\* cited by examiner

*Primary Examiner* — John Follansbee
*Assistant Examiner* — Maceeh Anwari
(74) *Attorney, Agent, or Firm* — Woodcock Washburn LLP

(57) ABSTRACT

Session multiplex protocol ("SMUX") is a protocol layered above existing reliable transport mechanisms that can be used to create multiple sessions over a single connection. Data from several different SMUX sessions can be interleaved and message boundaries preserved. Because it sits on top of reliable transport mechanisms, it takes advantage of the underlying protocols to ensure byte-alignment, loss detection/recovery, and reliable delivery. It provides a window based flow control mechanism to ensure suitable fairness among streams of different sessions and prevent deadlocks.

28 Claims, 8 Drawing Sheets

SESSION MULTIPLEX PROTOCOL

FIELD OF THE INVENTION

This invention relates in general to the field of networking protocols. More particularly, this invention relates to a protocol for creating multiple communication channels over a single physical connection.

BACKGROUND OF THE INVENTION

Currently, Structured Query Language ("SQL") clients are very synchronous in their connections. A client connected to a SQL server is only allowed one outstanding transaction or request from the SQL server at any given time. This can result in poor performance for the SQL client, because the client can be forced to wait for the SQL server to finish work on a larger transaction before submitting smaller transactions. This also results in a waste of resources, as any given client server connection may be underutilized resulting in wasted bandwidth.

One solution to this problem has been to open multiple simultaneous connections between the SQL client and the SQL server. However, this solution creates its own problems. For example, transaction latencies are increased due to time spent in the prelogin and login phases. There is also significant waste of resources associated with opening the new connection. These problems are further exacerbated when the transactions are small or short lived, because the cost of setting up and tearing down the connections can be greater than the benefits. In addition, this solution does not solve the problem of wasted bandwidth; each of the multiple connections is still not operating at its maximum capacity.

FIG. 1 is a block diagram of a prior art system. A client 101 is physically connected to a server 130 through connection 111. As discussed previously, SQL clients are limited to one outstanding transaction or request from the SQL server at any given time. This can cause difficulties because the client 101 may be forced to wait for the server 130 to complete a larger transaction before submitting a smaller transaction.

The prior art solution to this problem is illustrated at connection 113. The client 101 opens a second physical connection 113, allowing it to send additional transaction requests through connection 113 while it waits for the transaction over connection 111 to complete. However, this does not solve the problem of wasted bandwidth. Connection 111 is still being underutilized, possibly resulting in the server 130 refusing connections from other clients.

In view of the foregoing, there is a need for systems and methods that overcome the limitations and drawbacks of the prior art.

SUMMARY OF THE INVENTION

The present invention is directed to a session multiplex protocol that provides a mechanism to create multiple lightweight communication channels (sessions) over a single physical connection. Data streams from different sessions are multiplexed on top of a single transport channel. Through the session multiplex protocol, multiple commands can be executed simultaneously over a single connection. Clients no longer have to wait for a previous transaction to complete before requesting another transaction. As a result, bandwidth is no longer wasted by underutilized connections, and computing resources are saved by reducing the overall number of connections between the SQL client and server.

Session multiplex protocol ("SMUX") is an exemplary protocol layered above existing reliable transport mechanisms (e.g., TCP, Named Pipes) that can be used to create multiple sessions over a single connection. Data from several different SMUX sessions can be interleaved and message boundaries preserved. Because it sits on top of reliable transport mechanisms, SMUX takes advantage of the underlying protocols to ensure byte-alignment, loss detection/recovery, and reliable delivery. It provides a window based flow control mechanism to ensure suitable fairness among streams of different sessions and to prevent deadlocks.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Figure 1:
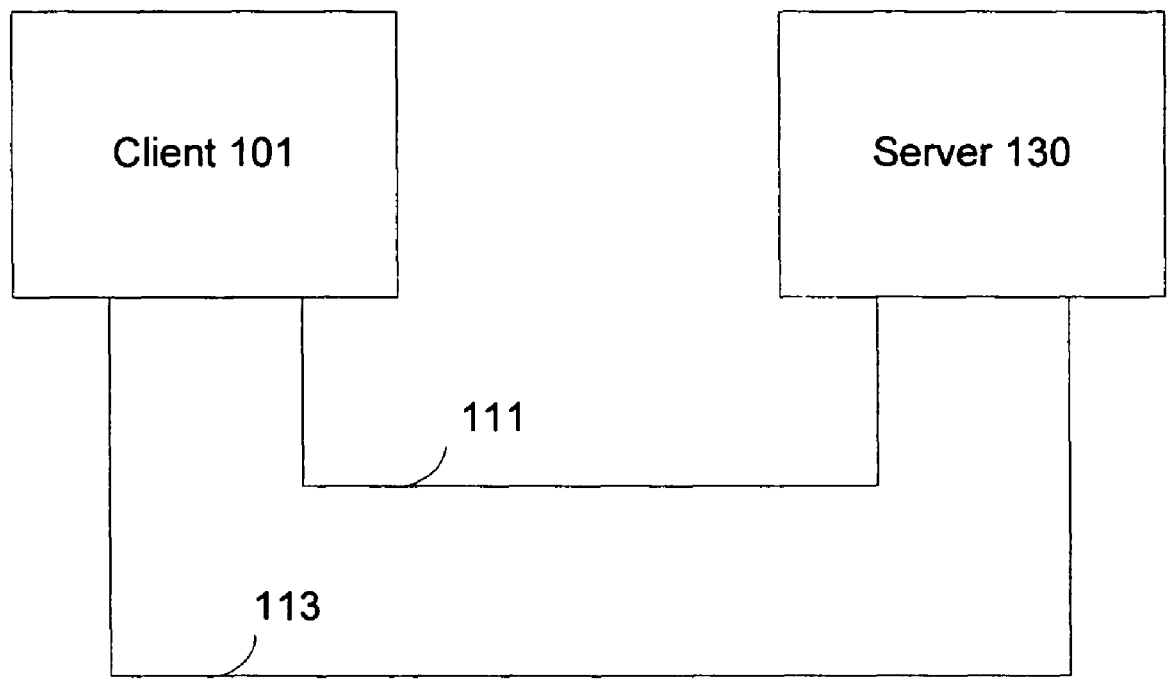
FIG. 1 is a block diagram of a prior art system.
Figure 2:
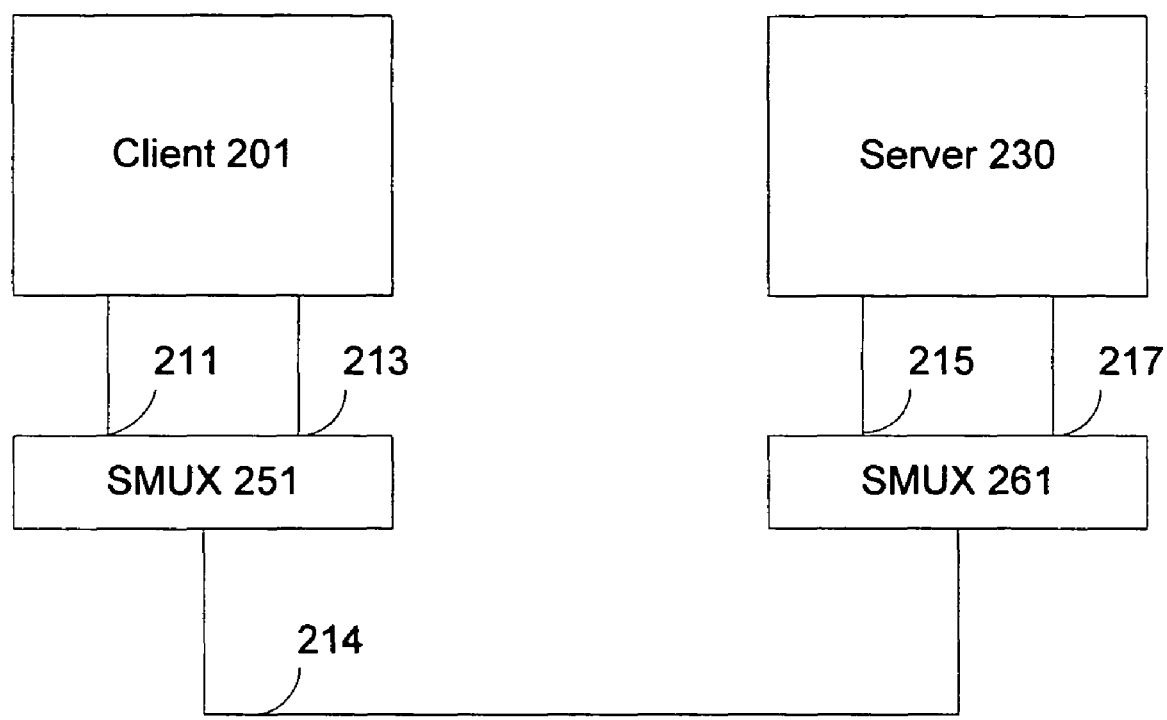
FIG. 2 is a block diagram of an exemplary system for use with an exemplary session multiplex protocol in accordance with the present invention.

FIG. 2 is a block diagram of an exemplary session multiplex protocol system 200 in accordance with the present invention. A client 201 is connected to a server 230 through SMUX 251 and SMUX 261 using connection 214. SMUX 251 and SMUX 261 allow the client 201 to submit multiple transaction requests using only a single physical connection 214. While only one client 201 and server 230 is illustrated, it is not meant to limit the invention to uses involving only one client or one server. There is no limit to the number of clients and servers that can be supported using the present invention. In addition, while the exemplary system is described in terms of a client and server, it is universally applicable to transactions between at least two network applications across a single physical connection.

The client 201 is connected through connections 211 and 213 to SMUX 251. Client 201 is not aware of SMUX 251, and behaves as if it has opened multiple physical connections to server 230. The server 230 is connected through connections 215 and 217 to SMUX 261. The server 230 is also not aware of SMUX 261, and behaves as if it has multiple physical connections open with client 201. Specifically, client 201 believes that connection 211 represents a first connection with server 230, and connection 213 represents a second connection to server 230, when in reality connection 211 and 213 are connected to SMUX 251. Similarly, server 230 believes that connection 215 represents a first connection with client 201, and connection 217 represents a second connection to client 201, when in reality connection 215 and 217 are connected to SMUX 261.

SMUX 251 and 261 effectively multiplex the physical connection 214 between the multiple session connections of the client 201 and server 230. A transaction from client 201 using connection 211, bound for server 230 using connection 215, is intercepted by SMUX 251. SMUX 251 constructs a SMUX packet containing the transaction as well as generated header data that allows the SMUX 261 to route the transaction to the correct session of server 230. The packet is then sent to SMUX 261 using the physical connection 214. On receipt of the packet, SMUX 261 removes the transaction from the packet and routes it to the correct connection to server 230 using the packet header information. In this manner, one physical connection is used to provide the illusion of multiple physical connections between the client 201 and the server 230. In addition, because the connection 214 is used for multiple simultaneous transactions, the available bandwidth is better utilized.

Figure 3:
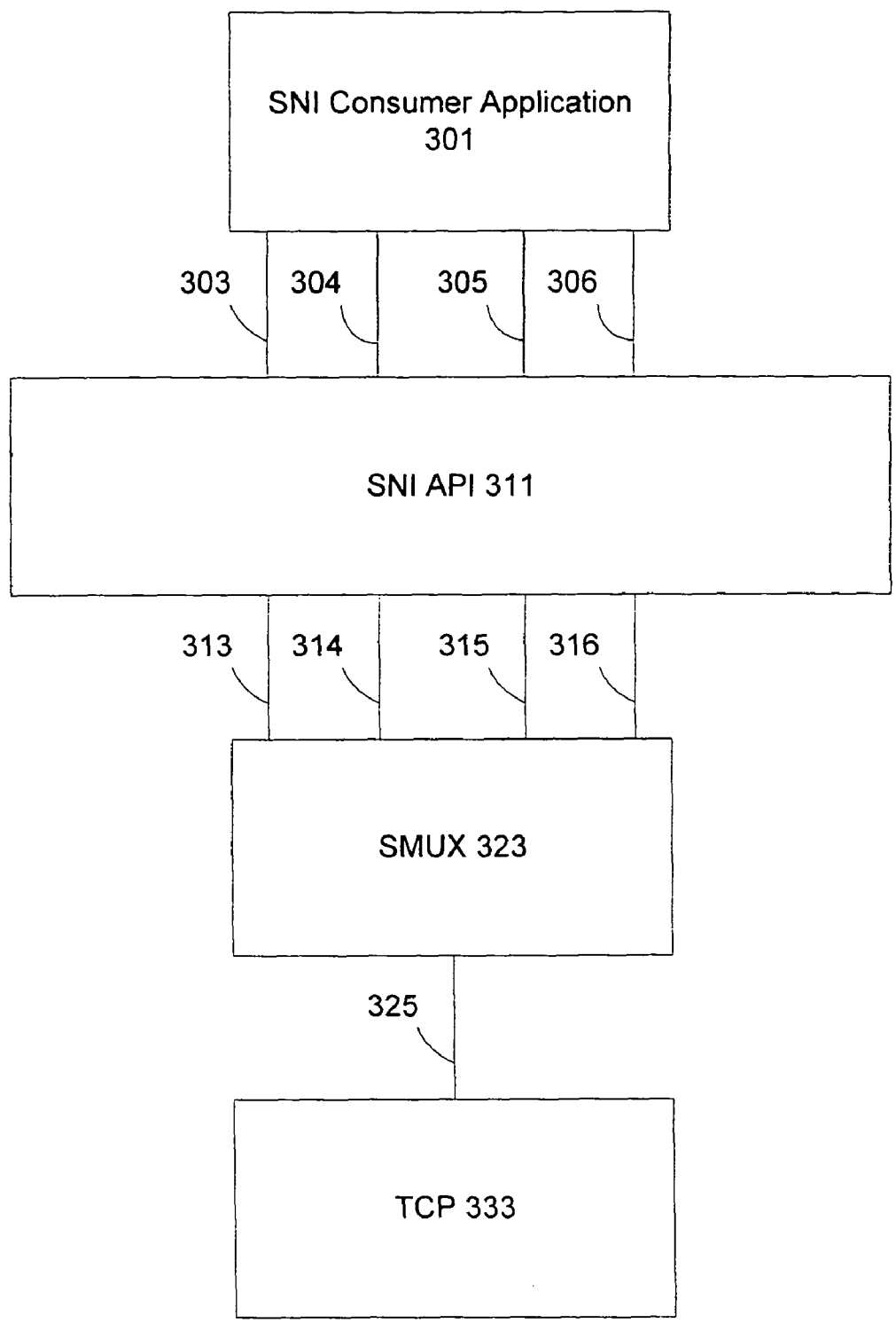
FIG. 3 is a block diagram illustrating an exemplary session multiplex protocol system and its integration with existing network systems in accordance with the present invention.

FIG. 3 is a block diagram illustrating an exemplary session multiplex protocol system 300, and illustrates how the system integrates with existing network systems, in accordance with the present invention. The system comprises a SQL Network Interface ("SNI") consumer application 301, connections 303, 304, 305, and 306, an SNI API 311, connections 313, 314, 315, and 316, SMUX 323, connection 325, and TCP 333.

SNI consumer application 301 is any typical network application known in the art, for example, a web browser or a SQL client. The SNI consumer application 301 communicates across the secure network using the SNI API 311. The SNI API 311 comprises a collection of network related programs and functions that can be installed on a computer as part of the operating system. The SNI consumer application 301 is able to connect with other computers across the network by making requests using the functions and programs supported in the SNI API 311.

Connections 303, 304, 305, and 306 represent network connections that SNI consumer application 301 has made, through the functions contained in SNI API 311. While only four connections are shown, there is no limit to the number of network connections that can be supported in the system. The four connections shown are for illustrative purposes only.

SMUX 323 is desirably connected to the SNI API 311 through connections 313, 314, 315, and 316. SMUX 323 receives the networking transactions of SNI consumer application 301, through the SNI API 311. SNI consumer application 301 believes that it is has multiple direct physical network connections through SNI API 311. In reality, SMUX 323 interfaces with SNI API 311 to multiplex the four connections across the network, making one physical network connection appear to be multiple sessions to the SNI consumer application 301.

The SMUX 323 is connected to the physical network connection 325. Connection 325 represents an actual connection to the network and interfaces with the network using a protocol such as TCP 333. The TCP protocol is shown for illustrative purposes only, and any system, method, or technique known in the art for networking protocols can be used.

SMUX 323 desirably receives transaction requests between the SNI consumer application 301 and some other SNI consumer application (not shown) across the network. SMUX 323 receives the multiple requests through the multiple connections 313-316 with SNI API 311.

Figure 4:
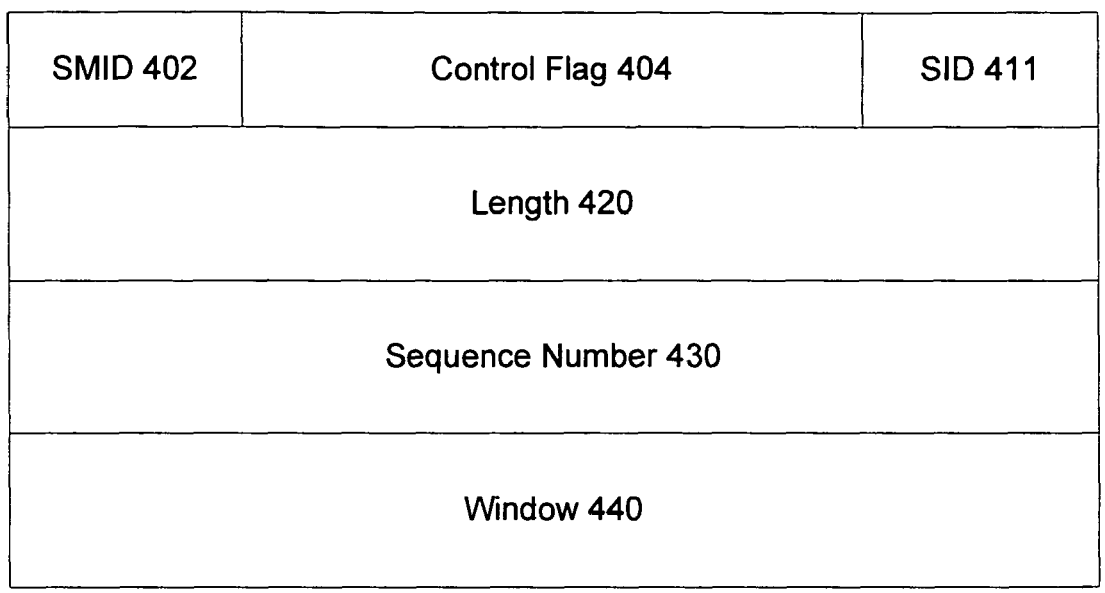
FIG. 4 is a diagram of an exemplary header for use with an exemplary session multiplex protocol in accordance with the present invention.

SMUX 323 packs each transaction into a SMUX packet, as illustrated in FIG. 4, for example. These packets identify the connection through which the SNI consumer application 301 had sent the original transaction. These packets are then sent across the network through the single connection 325 using the TCP protocol 333. Desirably, the packets are then received by another SMUX application on the other side of the connection 325 (not shown) where they are unpacked and carried to the desired session of the other SNI consumer application. In this way, SNI consumer application 301 believes that it has multiple physical connections across the network. Through interfacing the SNI API 311 with the SMUX 323, developers of network applications do not have to be aware of how multiple sessions are supported, and do not have to understand how the SMUX 323 operates. SNI consumer applications interface only with the SNI API 311, so once the SNI API 311 is updated to support SMUX, the SMUX 323 should be able to operate effectively with any SNI consumer application.

FIG. 4 is a diagram of an exemplary header 400 for use with a session multiplex protocol in accordance with the present invention. The header 400 is desirably used to identify the packet as a SMUX packet, close and open new connections, and ensure correct routing of the packet. The header 400 is desirably 16 bytes in length. The exemplary header 400 shown comprises SMUX packet identifier ("SMID") 402, control flag(s) 404, session identifier ("SID") 411, length 420, sequence number 430, and window 440. This description is meant to be an example implementation of the header 400, and is not meant to limit the invention to a header of a particular size or format.

The SMID 402 is desirably used to identify the packet as a SMUX packet. The SMID 402 can be 8 bits in length. Any method, system, or technique known in the art for packet type identification can be used.

The control flag 404 is desirably used to indicate the type of the SMUX packet. In the example embodiment the control flag 404 is one byte in length, but any appropriate control flag 404 can be used to accommodate the number of desired packet types.

In the exemplary embodiment, there are four different types of SMUX packet, each indicated by a different value of the control flag 404. These include the SYN packet, the ACK packet, the FIN packet, and the DATA packet (described further below). The four packet types are described for illustrative purposes only, and not meant to limit the invention to these types of packets.

The SYN packet is desirably used to indicate that a new connection or session is to be established between the receiver and sender. The SID 411 field desirably contains the session identifier that can be used to identify any subsequent SMUX packets as belonging to this session. Each session has an identifier. Session identifiers are allocated starting from zero. Once a session is closed, its session identifier becomes available for next session allocation. A new session is desirably established by setting the control flag 404 (e.g., to one) in the first message sent on that session. A SYN packet does not carry any user data because it is used to establish a new session. Therefore, total packet length is the size of header. There is desirably no SYN acknowledgement mechanism from the receiver, so a sender is free to send data immediately after sending the SYN packet. Eliminating the SYN packet acknowledgement reduces latency in session establishment because the additional overhead associated with the acknowledgment is avoided. In an embodiment, the SYN packet is indicated by a control flag 404 value of one.

The ACK packet is desirably used to inform the sender about the amount of memory buffer, or window size, available to receive packets. Multiplexing multiple sessions over a single transport connection introduces a potential "fairness" problem, which is a result of finite memory resources. For example, if a sender is using a protocol such as Winsock over TCP, the receiver is limited to a default 8 kb of receive buffer space. Assuming that a separate thread handles each individual SMUX session, and the buffer size of each connection is fixed, there can be problems when the sender sends a large amount of data to the receiver, or vice versa.

If the thread corresponding to the receiver is blocked or otherwise slow in consuming the received data, then the backpressure from the overflowing receiver's winsock buffer can cause the other session's data to be blocked as well. This can result in an unfair allocation of all available buffers to just one session, preventing other sessions from proceeding. This lack of fairness could also result in potential deadlock scenarios. SMUX applications desirably are able to buffer data independently for each session, and be able to throttle sessions where the consumer of the data is not responsive in the multiplexing layer.

An exemplary embodiment solves this fairness problem through the ACK packet. The receiver indicates to the sender (e.g., by means of an available window, indicating the number of receive buffers posted) that a certain amount of buffer space is available. The sender does not send data larger than the amount of buffer space that is available. If these rules are strictly followed, then a fair allocation of buffer space and resources is guaranteed. An ACK control message is used to indicate the available window for a session in bytes. Sessions have an initial (default) window size for each session, and the size can be changed through options on the ACK packet.

In order to keep the sender updated on the status of the packets sent to the receiver, the receiver desirably sends an ACK packet response to the sender once for every two data packets read by the receiver. This ACK packet indicates the size of the buffer available to the receiver after processing the last two packets. If the sender does not receive an ACK packet from the receiver, the sender will not continue to send data packets until it receives the ACK packet. Bottlenecks and buffer overflows are prevented by requesting the receiver to acknowledge received packets as they are processed. In an embodiment, the ACK packet is indicated by a control flag 404 value of two. The ACK packet contains no data, and is comprised by the SMUX header.

The FIN packet is desirably used to indicate that the sending entity will no longer use the session to send data. The receiver of the FIN packet desirably responds with a FIN packet of its own, confirming that the session is closed and making the SID available for new sessions. In an embodiment, the FIN packet contains no data, and is comprised by the SMUX header. In an embodiment, the FIN packet may be indicated by a control flag 404 value of four.

The DATA packet is desirably used to carry data between a sender and receiver over a particular session. The DATA packet desirably contains the data directly after the SMUX header. The size and amount of data sent over a session can vary depending on the size of the available buffer window, set for each session using the ACK packet. The length of the DATA packet can vary and can be determined, for example, by subtracting the size of the SMUX header from the value contained in the length 420 field of the header. For example, a length 420 value of 0x25 indicates 0x15 of user data. In an embodiment, the DATA packet is indicated by a control flag 404 value of eight.

The SID 411 is desirably used to identify the SMUX session that the packet belongs to. Each session is desirably issued an SID 411 when the first SYN packet is sent. The SID 411 can be fixed at 16 bits in length, resulting in $2^{16}$ possible sessions, for example. A particular embodiment can utilize a larger or smaller fixed SID 411 size depending on the number of sessions anticipated. A particular SID 411 can be reused after the session has been completely terminated, as indicated by the FIN packet. The sender and receiver each may keep a list of the available SIDs to ensure that no two SIDs are used simultaneously. Any system, method, or technique in the art for issuing identification numbers from a pool of available numbers may be used. In the present embodiment, SIDs are issued sequentially, starting with zero. After a particular session is closed, its SID becomes available for the next opened session.

Length 420 is desirably used to indicate the total length of the packet, and is used to determine the boundaries of each SMUX packet. The length 420 can be fixed at 32 bits, for example. A larger or smaller fixed size for the length 420 can be chosen. The length 420 indicates the total size of the SMUX packet, including the header. The SMUX packet of type data is desirably the only packet that contains any data; therefore, for all other packet types this value can be 16 bytes, for example, which is the size of the default SMUX header.

Sequence number 430 is desirably used to number each packet sent in a particular session, and is desirably used, along with the window 440, to calculate the available buffer space. The sequence number 430 can be fixed at 32 bits. The first packet on each session desirably has a sequence number value of zero. Preferably, only data packets are given sequence numbers, because they are the only packet type that affects the session buffer. The other packet types are desirably processed by the SMUX application immediately on receipt and do not affect the session buffer. Sequence number 430 values of subsequent data packets on the same session are monotonically increased until a maximum value (e.g., 0xffffffff) is reached at which point subsequent packets start again at zero. The fixed size of the sequence number 430 can be increased or decreased in alternate embodiments depending on the number of packets expected for a given application.

Window 440 is desirably used to indicate the limit for receive data packets. The window 440 is the maximum sequence number of the packet the receiver is prepared to accept at any given time. The window 440 indicates the maximum sequence numbers up to which the sender is allowed to send. The difference between the window 440 and the last sequence number sent is the available window size.

Figure 5:
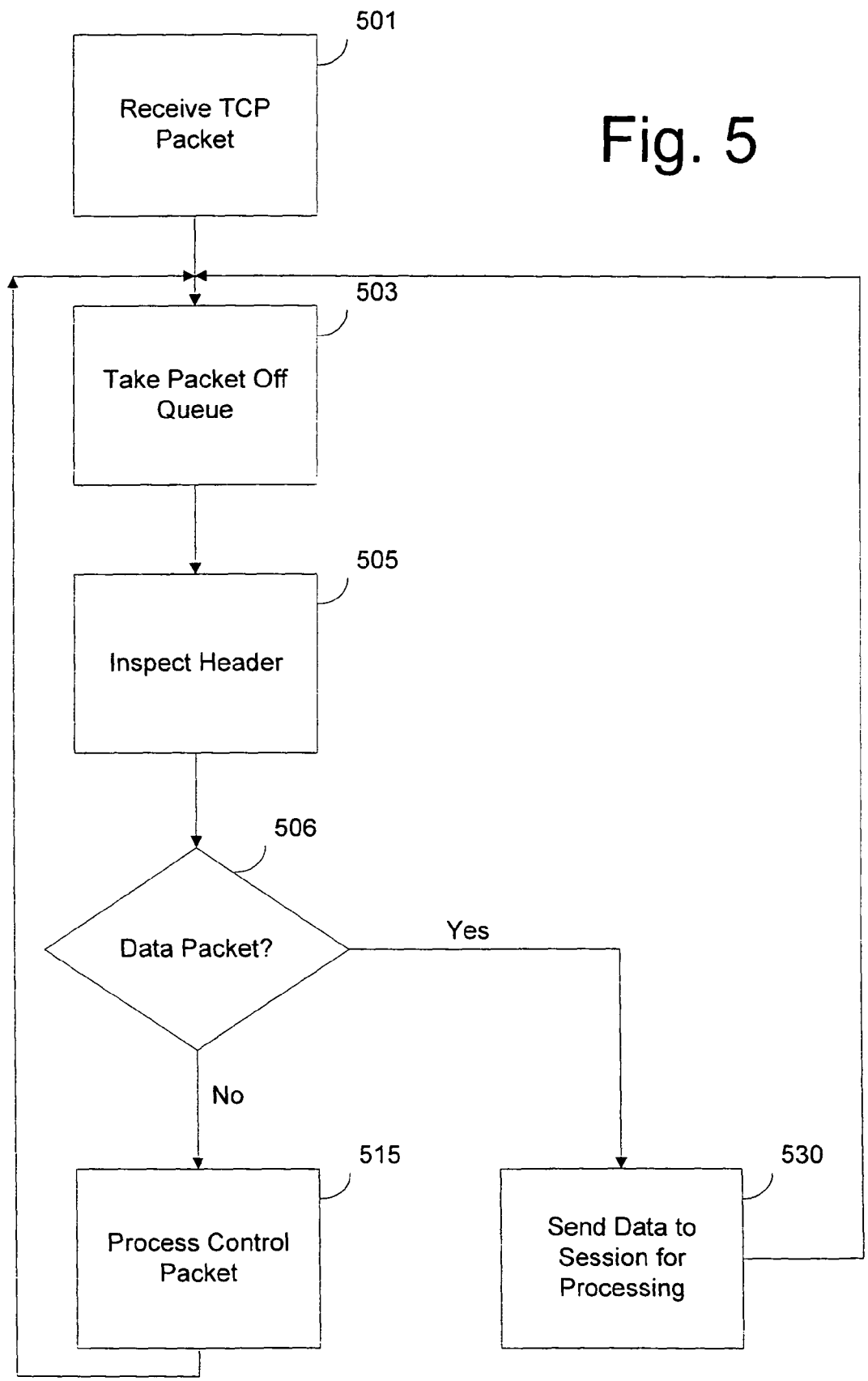
FIG. 5 is a flow diagram illustrating an exemplary method for receiving and processing a session multiplex protocol packet in accordance with the present invention.

FIG. 5 is a flow chart of an exemplary method for receiving and parsing SMUX packets. A SMUX packet is received, and added to a queue. A SMUX packet is removed from the queue for processing. The packet is inspected to determine the SID and the type of the packet. If the packet is a SYN, FIN, or ACK packet, the instructions contained in the packet are carried out. If the packet is a DATA packet, it is determined if there is buffer space to receive the packet, and if so, the data is passed to the corresponding session. While the flow chart is described with reference to transactions between a client and a server, it is applicable to transactions between any two network applications, and is not meant to limit the invention to a client and server.

More particularly, at 501, a packet is received. The packet can be of any type supported by the system, such as TCP. Any method, technique, or system known the art for data packets can be used. The packet may contain one or more SMUX packets.

The SMUX packets are desirably removed from the carrier packet. Using the length data field contained in the header of each packet, each individual SMUX packet can be removed from the carrier packet. Each SMUX packet is then added to a queue for processing.

At 503, a SMUX packet is taken off of the queue for processing. The queue can be of the type first in, first out, but any other system, technique, or method known in the art for queuing packets for processing may be used.

At 505, the SMUX packet is inspected to determine its corresponding session. The session can be determined by viewing the SID number stored in the SMUX packet header, as described with respect to FIG. 4, for example.

At 506, the SMUX packet is inspected to determine the type of SMUX packet. The type of the packet can be determined by viewing the control flag, which may also be part of the SMUX packet header described with respect to FIG. 4, for example. If the SMUX packet is of type "data", the embodiment continues to 530; otherwise, the SMUX packet is a control packet, and the embodiment continues at 515.

At 515, it has already been determined that the SMUX packet is a control packet. Since control packets contain no data, and are used solely by the SMUX program to control the sessions, they desirably are processed immediately and do not affect the buffer window allotted to each of the open sessions.

If the SMUX packet is a SYN packet, indicated by a control flag value of one, for example (or another predetermined value), then the SMUX application opens a new session with the server using the SID value that is contained in the header. If the SID value is already in use, or the number of open sessions exceeds some predefined maximum number of sessions, the SMUX application can return an error message to the client. Otherwise, the SMUX application opens the requested session with the server. As discussed with respect to FIG. 4, desirably no acknowledgement message of a successful SYN packet is sent to the client.

If the SMUX packet is a FIN packet, indicated by a control flag value of four, for example (or another predetermined value), then the SMUX application closes the session with the SID value indicated in the header. If the indicated SID is already closed, then the SMUX application should do nothing. To close the session, the SMUX application removes the SID from the list of open sessions, and adds the SID back into the pool of available SID numbers. A subsequent SYN packet will be assigned this now available number. The SMUX application then closes the session with the server, and sends a FIN packet back to the SMUX application that sent the original FIN packet as an acknowledgment of the session closing.

If the SMUX packet is an ACK packet, indicated by a control flag value of two, for example (or another predetermined value), then the SMUX application updates the available window for the session with the SID matching the SID of the SMUX packet. The window is updated by an amount specified in the window section of the SMUX header. The default window size for every session is four packets, for example. As a result, any given session can have a maximum of four packets waiting in the queue for that session. This prevents any one session from using all of the available bandwidth since it will be limited to four SMUX packets waiting to be processed at any time. Updating the available window for that session allows the SMUX application to send additional packets to the session. Each time a data packet is sent to any given session, the window for that session is decreased. If the window decreases to zero, it indicates that there is no more room in the buffer for that session. Any more data packets to be sent to that session are then forced to wait until another ACK packet is received.

After the SMUX packet has been fully processed, the embodiment returns to 503 and processes the next SMUX packet in the queue.

At 530, it has been determined that the SMUX packet is a data packet and is ready to be sent to the session for processing. The data packet is for the session indicated by the SID number contained in the SMUX header. Each SMUX session has an associated window or buffer used to hold data packets for processing. The amount of space in each buffer is kept track of by the SMUX application. SMUX applications on both the server side and the client side keep track of the available window size of each session, and do not send a new data packet unless the buffer space is available. After every two packets that a session processes, it sends an ACK packet indicating that two packets have been processed and there is room in the buffer. The flow control, as described earlier with respect to FIG. 4, ensures that no packet is received unless there is buffer space available for it. Once it has been determined that there is suitable buffer space available, the data packet is sent to the session for processing. The embodiment then returns to 503 and processes the next SMUX packet in the queue.

Figure 6:
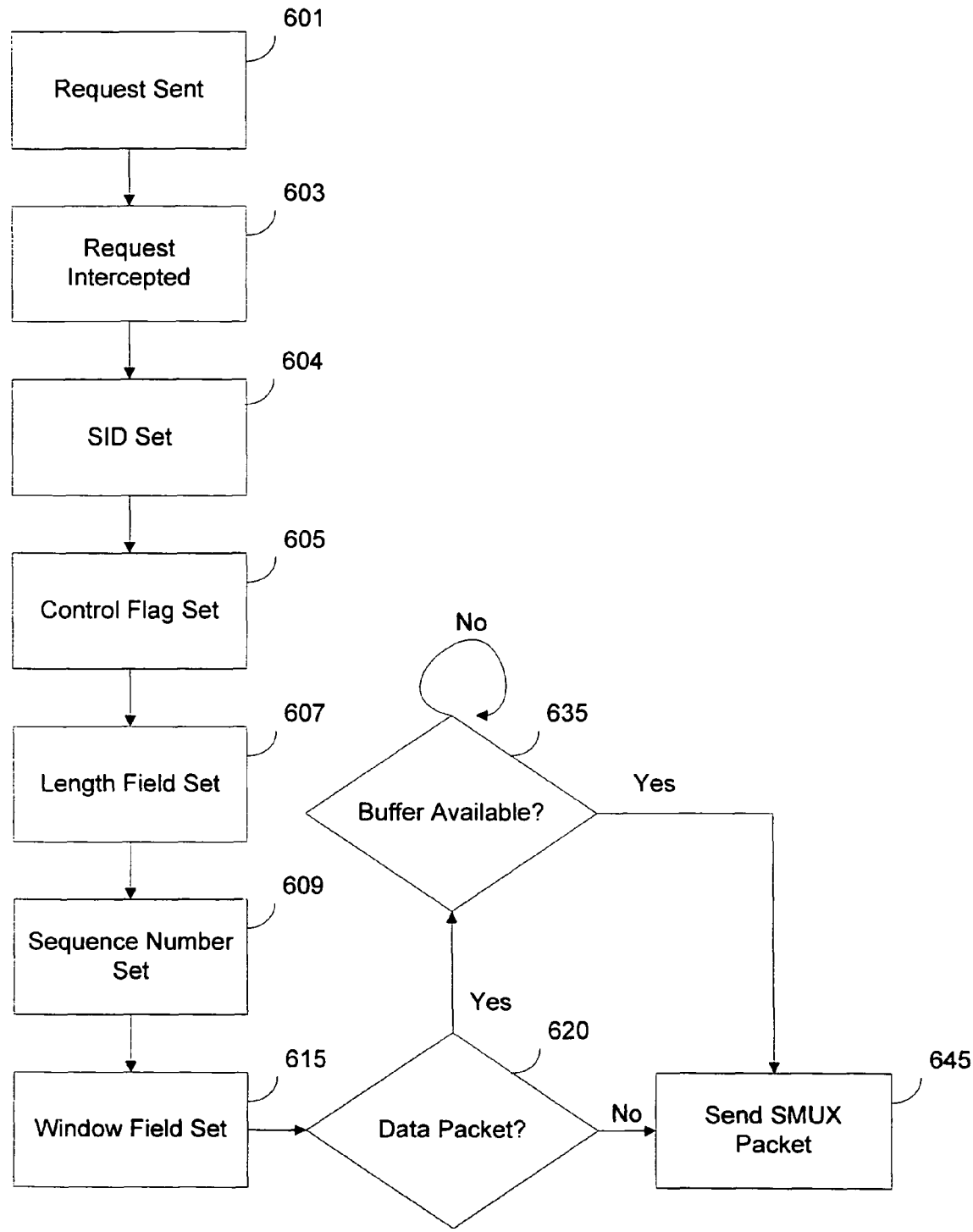
FIG. 6 is a flow diagram illustrating an exemplary method for generating and sending a session multiplex protocol packet in accordance with the present invention.

FIG. 6 is a flow chart of an exemplary method for receiving client transaction requests and creating and sending equivalent SMUX packets. While the flow chart is described with reference to transactions between a client and a server, it is applicable to transactions between any two network applications, and is not meant to limit the invention to a client and server. A client sends a transaction request to a server at a particular session. The SMUX application intercepts the request. The SMUX application constructs a SMUX packet containing the intercepted request. The SMUX application sends the SMUX packet over the physical connection using any supported protocol. A SMUX application on the other side of the dedicated connection receives the SMUX packet and forwards it to the appropriate session for processing.

At 601, the client sends a request to a server. This request can be one of three types, for example: a transaction, a request to open a new session connection, or a request to close a session.

At 603, the SMUX application intercepts the request and constructs a SMUX packet. As shown in FIG. 2 at 214, for example, there is one dedicated connection between the client and server. However, the client and server believe that they have multiple session connections open between them, as shown in FIG. 2 at 211, 213, 215 and 217. In order to create the illusion of multiple open sessions, the SMUX applications, shown in FIG. 2 at 251 and 261, desirably intercept requests between the server and client over the various sessions and repackages them in SMUX packets, effectively multiplexing the single dedicated connection into multiple sessions. At 604, the SMUX application begins to construct the SMUX packet starting with the SID.

At 604, the SMUX application begins to construct the SMUX packet. The SMUX packet comprises the SMID, SID, the control flag, the packet length, the sequence number, the window, and the appended data, for example. The SID, as described with respect to FIG. 4 for example, corresponds to the session number that the transaction was directed to. If the transaction is a request to open a new session with the server, then the SID is taken from the list of available SID numbers as described with respect to FIG. 4. Otherwise, the SID that corresponds to the session that the transaction was directed to is used.

At 605, the SMUX application sets the control flag(s). The control flag(s), as described herein, are set by the SMUX application. The value of the control flag depends on the type of SMUX packet being sent. If the packet is a SYN packet, indicating a new connection, then the control flag is desirably set to one. If the packet is a FIN packet, indicating that connection should be closed, the control flag is desirably set to four. If the packet is an ACK packet, indicating that buffer space is available, then the control flag is desirably set to two. If the packet is a DATA packet, indicating that it carries transaction data, then the control flag is desirably set to eight. The particular values chosen for the control flag are not meant to limit the invention to control flags of particular values.

At 607, the SMUX application calculates the length field. The length of the packet is determined by the SMUX application and set in the length field of the header. For control packets, such as FIN, SYN, and ACK, the length will desirably be the size of the header because they contain no data. For a data packet, the length is preferably the size of the data plus the size of the header.

At 609, the sequence number of the packet is determined by the SMUX application. For each open session, the SMUX application maintains an updated list of the current packet sequence number. Data packets are given a sequence number because the sequence number is used by the SMUX application in determining the available window size for a particular session. If the packet is a data packet, the sequence number is desirably one greater than the previous used sequence number, otherwise it is set to zero.

At 615, the window field in the header is determined by the SMUX application. The window field is used to indicate the available buffer space remaining for any given session. The window field is utilized by ACK packets. For other types of packets, the value of this field may be zero. An ACK packet containing the available window space of a particular session is desirably sent by the SMUX application after every two data packets are processed by a particular session. This avoids any one session from stealing the available bandwidth, since a particular session may receive new data packets after it has processed the data packets that were sent previously.

At 620, it is determined if the packet is a data packet. If the packet is a data packet, then the embodiment continues at 635 where the data can be appended to the header and it can be determined if there is available buffer space for the session. If the packet is not a data packet, then the embodiment can continue to 645 where the packet is sent.

At 635, it has been determined that the SMUX packet is a data packet and the SMUX application checks if there is enough window space for the session to accommodate the packet. To avoid bandwidth sharing problems, each session is by default allotted four outstanding SMUX data packets, for example. After a session has processed two data packets, it sends an ACK packet to indicate that it has available window space to receive more packets. The SMUX application desirably keeps a list for each session and how much window space is available for it. If there is enough space for the SMUX packet, the available window space for that session is decremented by one, and the embodiment continues at step 645 where the packet is sent. If there is not enough window space for the packet, then the SMUX application desirably queues the packet for sending after an ACK response has been received.

At 645, the SMUX packet is desirably sent across the dedicated connection using a protocol, such as TCP. The packet is desirably received by another SMUX application, where it is processed, and if desired, routed to the appropriate session.

Figure 7:
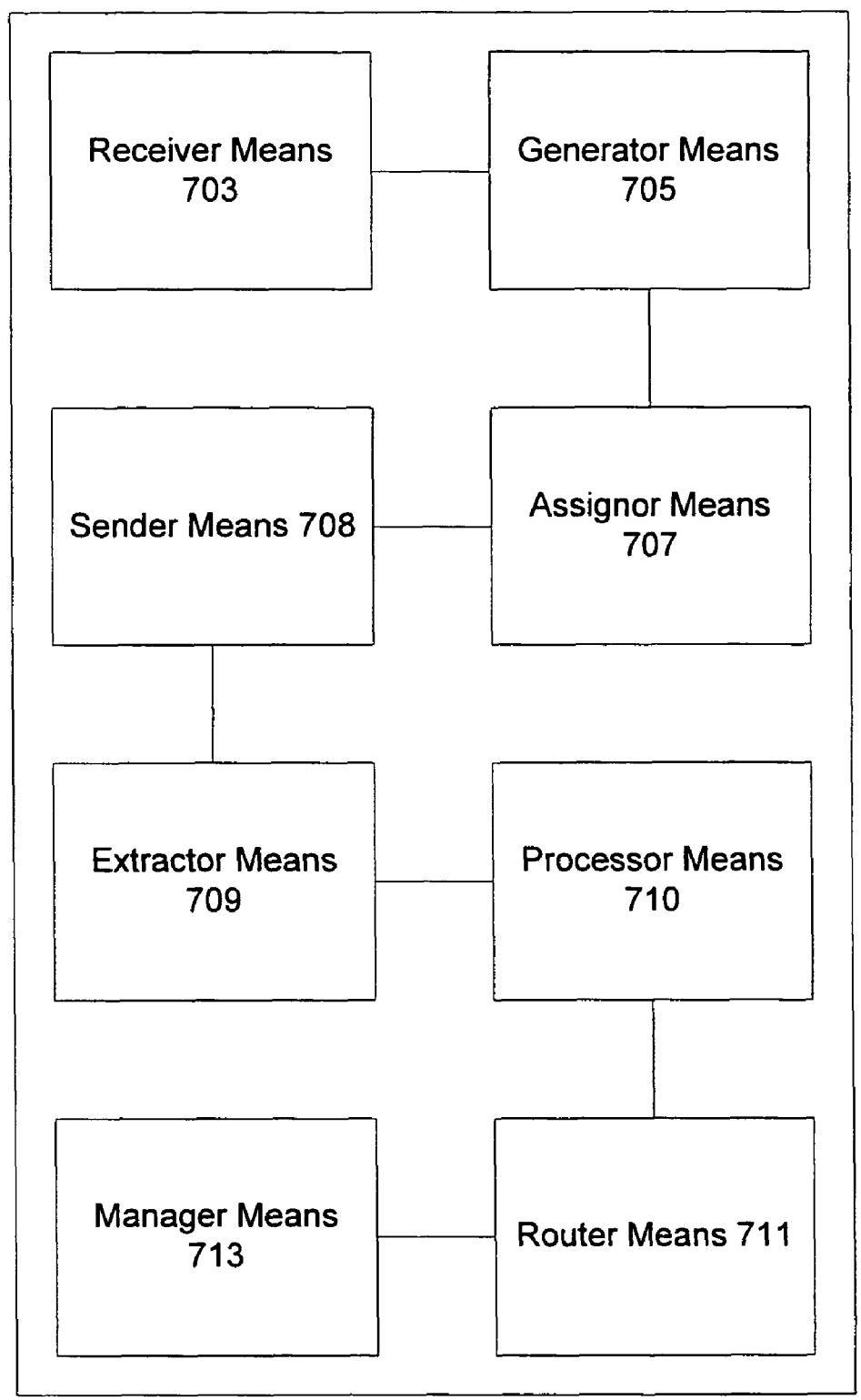
FIG. 7 is a block diagram of another exemplary session multiplex protocol system in accordance with the present invention.

FIG. 7 is a block diagram of an exemplary session multiplexing protocol system 700 in accordance with the present invention. The multiplexing protocol system includes several means, devices, components, and/or modules for performing functions. These include a receiver 703, a generator 705, an assignor 707, a sender 708, an extractor 709, a processor 710, a router 711, and a manager 713. While the diagram is described with reference to transactions between a client and a server, it is applicable to transactions between any two network applications, and is not meant to limit the invention to a client and server.

The receiver 703 receives a session transaction between a client and a server. A session transaction is sent by a client to a server where it is intercepted by the SMUX application. The receiver 703 can be implemented using any suitable system, method or technique known in the art for intercepting a transaction. The receiver 703 can be implemented using software, hardware, or a combination of both. The receiver 703 can be a part of the session multiplexing protocol system, as shown, for example, in FIG. 2.

The generator 705 generates a SMUX packet based on the contents of the received session transaction. The format of the SMUX packet allows multiple sessions to exist simultaneously, and transparently over a single physical connection. The generator 705 can be implemented using any suitable system, method or technique known in the art for generating a packet. The generator 705 can be implemented using software, hardware, or a combination of both. The generator 705 can be a part of the session multiplexing protocol system, as shown, for example, in FIG. 2.

The assignor 707 assigns values to the fields of the SMUX packet header as described with respect to FIG. 4. The SMUX header desirably includes a SID field, a control flag, a length field, a sequence field, an window field. The assignor 707 can be implemented using any suitable system, method or technique known in the art for generating a packet header. The assignor 707 can be implemented using software, hardware, or a combination of both. The assignor 707 can be a part of a session multiplexing protocol system, as shown for example, in FIG. 2.

The sender 708 desirably sends one or more SMUX packets using a protocol of the underlying network architecture, such as TCP, across the physical connection. The sender 708 can be implemented using any suitable system, method or technique known in the art for sending data across a network. The sender 708 can be implemented using software, hardware, or a combination of both. The sender 708 can be a part of a session multiplexing protocol system.

The extractor 709 extracts the SMUX packets from the TCP packet. The SMUX packets can be extracted from the TCP packet using the length data stored in the SMUX packet header. The extractor 709 can be implemented using any suitable system, method or technique known in the art for extracting data from a packet. The extractor 709 can be implemented using software, hardware, or a combination of both. The extractor 709 can be a part of the session multiplexing protocol system, as shown, for example, in FIG. 2.

The processor 710 processes the extracted SMUX control packets. The control packets include the SYN packet, the ACK packet, and the FIN packet, for example. The processor 710 can be implemented using any suitable system, method or technique known in the art for processing packets. The processor 710 can be implemented using software, hardware, or a combination of both. The processor 710 can be a part of the session multiplexing protocol system, as shown, for example, in FIG. 2.

The router 711 routes the extracted SMUX data packets to the indicated session connection. The data packets are routed using the SID field contained in the SMUX header. The router 711 can be implemented using any suitable system, method or technique known in the art for routing data. The router 711 can be implemented using software, hardware, or a combination of both. The router 711 can be a part of an exemplary session multiplexing protocol system.

The manager 713 manages the available buffer for each session. A session is desirably only permitted a certain number of data packets waiting for processing, effectively preventing any single session from hoarding the available bandwidth. The manager 713 desirably maintains a list for each session containing the available buffer, and after every two data packets (or other predetermined or calculated number of data packets) are processed by a session, sends an ACK message updating a receiving SMUX application of the change in buffer size. The manager 713 can be implemented using any suitable system, method or technique known in the art for buffer management. The manager 713 can be implemented using software, hardware, or a combination of both. The manager 713 can be a part of the session multiplexing protocol system, as shown, for example, in FIG. 2.

Exemplary Computing Environment

Figure 8:
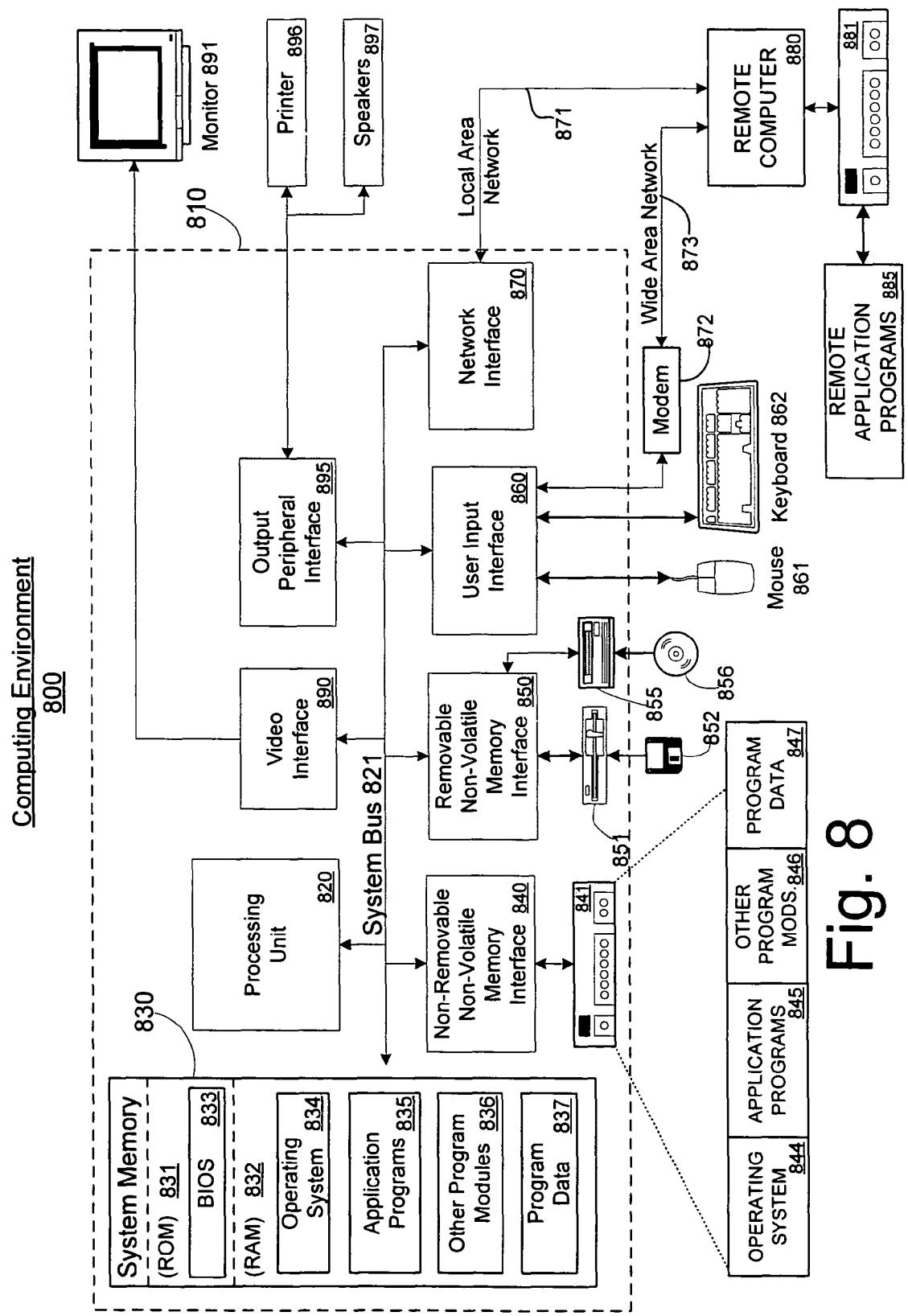
FIG. 8 is a block diagram showing an exemplary computing environment in which aspects of the invention may be implemented.

FIG. 8 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/non-volatile computer storage media. By way of example only, FIG. 8 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method implemented in a computing system of communicating between a first network application and a second network application, comprising:

receiving at a first multiplexer application a plurality of SQL transactions from a first network application directed to a second network application, the second network application being a SQL server application, each of the plurality of SQL transactions associated with a separate logical session between the first network application and the second network application;

for each of the plurality of SQL transactions, generating a packet comprising the SQL transaction and a session identifier identifying a logical session between the first network application and the second network application;

sending the generated packet through a physical connection to a second multiplexer application, using a supported network protocol;

receiving the generated packet through the physical connection using the supported protocol at the second multiplexer application;

retrieving the generated packet from the supported protocol;

processing the generated packet to retrieve the SQL transaction; and for the SQL transaction:

identifying from the session identifier the logical session associated with the SQL transaction between the first network application and the second network application; and when the packet is a data packet, forwarding the SQL transaction to the second network application at the logical session, the forwarding the SQL transaction comprising checking if there is sufficient buffer space available for the session, and forwarding the transaction to the second network application if there is sufficient buffer space available.

2. The method of claim 1, wherein checking if there is sufficient buffer space available comprises checking a list of available buffer space for each session and if the available buffer space is greater than or equal to the amount required for the transaction, determining that there is sufficient buffer space.

3. The method of claim 1, wherein generating a packet containing the received transaction and routing information comprises:

generating a header for the packet, wherein the header comprises a session identification field, a control flag field, a window field, a sequence number field, and a length field; and appending transaction data from the transaction, if any, to the packet header.

4. The method of claim 3, further comprising setting the window field to the available buffer space for the session, if the transaction is a data transaction, else setting the window field to zero.

5. The method of claim 3, further comprising increasing the sequence number by one more than a stored sequence number for the session only if the transaction is a data transaction, else setting the sequence number to zero.

6. The method of claim 3, further comprising setting the control flag to indicate the type of packet generated.

7. The method of claim 6, wherein setting the control flag to indicate the type of packet generated further comprises:

setting the control flag to indicate that the packet is a FIN packet, if the received transaction is a request to close a session, wherein the FIN packet carries instructions to close a session;

setting the control flag to indicate that the packet is a SYN packet, if the received transaction request is a request to open a session, wherein the SYN packet carries instructions to open a session; and setting the control flag to indicate that the packet is a DATA packet, if the received transaction request is a data transaction, wherein the DATA packet carries data for a particular session.

8. The method of claim 3, further comprising setting the length field to the length of the header plus the appended data if any.

9. The method of claim 1, wherein processing the generated packet comprises:

determining the type of the packet;

if the packet is an ACK packet, wherein the ACK packet carries instructions to update a session buffer, updating the available buffer space for the session by the amount specified in the window field;

if the packet is a FIN packet, wherein the FIN packet carries instructions to close a session, adding the session identification number to a list of available session identification numbers, removing the session identification number from a list of active sessions, and generating a response packet and sending it to the first network application; and if the packet is a SYN packet, wherein the SYN packet carries instructions to open a session, opening a new session by adding the session identification number to the list of active sessions.

10. The method of claim 1, further comprising receiving the transaction by the second network application at the logical session, and adding the transaction to a buffer.

11. The method of claim 10, further comprising updating the available buffer space for the logical session to indicate that the transaction has been added to the buffer.

12. The method of claim 10, further comprising processing a received transaction from the buffer for the logical session by the second network application.

13. The method of claim 12, further comprising generating and sending an ACK packet, wherein the ACK packet carries instructions to update a session buffer, to the first network application by the second multiplexer application, indicating that buffer space is available for the logical session.

14. A system that multiplexes logical sessions over a physical connection comprising:

means for receiving at a first multiplexer application a plurality of SQL transactions from a first network application directed to a second network application, the second network application being a SQL server application, each of the plurality of SQL transactions associated with a separate logical session between the first network application and the second network application;

means for generating, for each of the plurality of SQL transactions, a packet based on the contents of the SQL transaction and comprising a session identifier identifying a logical session between the first network application and the second network application at the first multiplexer;

means for sending the generated packet to a second multiplexer, along with other generated packets if any, using a protocol supported by the physical connection; and means for extracting the generated packet at the second multiplexer, along with other generated packets if any, from the protocol supported by the physical connection;

means for processing the generated packet at the second multiplexer to retrieve the SQL transaction; and means for the SQL transaction:

identifying from the session identifier the logical session associated with the SQL transaction between the first network application and the second network application; and when the packet is a data packet, forwarding the SQL transaction to the second network application, the forwarding the SQL transaction comprising checking if there is sufficient buffer space available for the session, and forwarding the transaction to the second network application if there is sufficient buffer space available.

15. The system of claim 14, further comprising:

means for routing the generated packet to the session, if the generated packet is a data packet; and means for managing an available buffer for the session.

16. The system of claim 14, wherein the means for generating a packet further comprises means for assigning values to a packet header.

17. A method implemented in a computing system of communicating between a first network application and a second network application, comprising: sending using an API a plurality of SQL transactions from the first network application directed to the second network application through one of a plurality of logical sessions, the SQL transactions comprising transaction data, the second network application being a SQL server application, each of the plurality of SQL transactions associated with a separate logical session between the first network application and the second network application;

receiving the plurality of SQL transactions at a first multiplexer, and formatting each of the plurality of SQL transactions to form a packet, wherein the packet comprises a logical session identifier field indicating the session used to send the transaction between the first network application and the second network application, and a data field containing the transaction data;

sending the packet from the first multiplexer to a second multiplexer across a network using a supported network protocol; receiving the packet by the second multiplexer;

processing the packet by the second multiplexer, comprising removing the SQL transaction from the packet; and for the SQL transaction:

identifying from the session identifier the logical session associated with the SQL transaction between the first network application and the second network application; and forwarding the SQL transaction data to the second network application through the one of the logical session identified by the session identifier field, the forwarding the SQL transaction comprising checking if there is sufficient buffer space available for the session, and forwarding the transaction to the second network application if there is sufficient buffer space available.

18. The method of claim 17, wherein determining if there is buffer space available comprises checking a list of available buffer space for each session and if the available buffer space for the one of the plurality of communication sessions is greater than or equal to the amount required for the transaction, concluding that there is buffer space available.

19. The method of claim 17, further comprising updating the available buffer space for the one of the plurality of communication sessions to indicate that the transaction has been added to the buffer.

20. The method of claim 17, further comprising processing a received transaction from the buffer for the one of the plurality of communication sessions by the second network application.

21. The method of claim 20, further comprising generating and sending a packet to the first network application by the second multiplexer, indicating that buffer space is available for the one of the plurality of communication sessions.

22. The method of claim 17, wherein the packet further comprises:
a control flag field indicating the type of the packet;
a window identifier field indicating the available buffer space for the communication session;
a sequence number field indicating the order of the packet; and
a length field indicating the total length of the packet.

23. The method of claim 17, further comprising receiving the transaction by the second network application at the one of the plurality of communication sessions, and adding the transaction to a buffer.

24. A system, comprising:
a computing processor;
computing memory communicatively coupled with the computing processor, the computing memory having instructions for providing:
a first network application that sends a plurality of SQL transactions directed to a second network application, the second network application being a SQL server application, each of the plurality of SQL transactions associated with a separate logical session between the first network application and the second network application;

a first multiplexer that receives the plurality of SQL transactions from the first network application, generates for each of the plurality of SQL transactions a packet comprising the SQL transaction and a session identifier identifying a logical session between the first network application and the second network application, and sends the generated packet over a physical connection using a supported protocol, and a second multiplexer that receives the generated packet over the physical connection using the supported protocol; removes the generated packet from the supported protocol; processes the generated packet; identifies a logical session associated with the SQL transactions; and forwards the SQL transactions to the second network application through the logical session, the forwarding the SQL transactions comprising checking if there is sufficient buffer space available for the session, and forwarding the transactions if there is sufficient buffer space available.

25. A system for communicating between a first network and a second network, comprising:
one or more computing processors;
computing memory communicatively coupled with the one or more computing processors, the computing memory having instructions for providing:
an application at a first network that sends a plurality of SQL transactions directed to a second application, the second application being a database application, each of the plurality of SQL transactions associated with a separate logical session between the first network application and the second network application;
a multiplexer at the first network that receives the plurality of SQL transactions from the application at the first network, generates, for each of the plurality of SQL transactions, a packet comprising the SQL transaction and a session identifier identifying a logical session between the first network application and the second network application, and sends the generated packet over a physical connection using a supported protocol to a second multiplexer at the second network;
a multiplexer at the second network that receives the generated packet over the physical connection using the supported protocol, removes the generated packet from the supported protocol, processes the generated packet, identifies a logical session associated with the SQL transactions; and forwards the SQL transactions to the second network application through the logical session, the forwarding the SQL transactions comprising checking if there is sufficient buffer space available for the session, and forwarding the transactions if there is sufficient buffer space available.

26. A computer readable storage device having stored thereon computer readable instructions that, if executed by a computing system, cause the computing system to perform operations comprising:
receiving at a first multiplexer application a plurality of SQL transactions from a first network application directed to a second network application, the second network application being a SQL server application, each of the plurality of SQL transactions associated with a separate logical session between the first network application and the second network application;
for each of the plurality of SQL transactions, generating a packet comprising the SQL transaction and a session identifier identifying a logical session between the first network application and the second network application;

sending the generated packet through a physical connection to a second multiplexer application, using a supported network protocol;

receiving the generated packet through the physical connection using the supported protocol at the second multiplexer application;

retrieving the generated packet from the supported protocol;

processing the generated packet to retrieve the SQL transaction; and for the SQL transaction:
  identifying from the session identifier the logical session associated with the SQL transaction between the first network application and the second network application; and
  when the packet is a data packet, forwarding the SQL transaction to the second network application at the logical session, the forwarding the SQL transaction comprising checking if there is sufficient buffer space available for the session, and forwarding the transaction to the second network application if there is sufficient buffer space available.

27. A computer-readable storage medium containing computer-executable instructions for performing the method of claim 1.

28. A computer-readable storage medium containing computer-executable instructions for performing the method of claim 17.

* * * * *